(12) United States Patent
Matteo

(10) Patent No.: US 7,998,418 B1
(45) Date of Patent: Aug. 16, 2011

(54) EVAPORATOR AND CONCENTRATOR IN REACTOR AND LOADING SYSTEM

(75) Inventor: Joseph C. Matteo, Walland, TN (US)

(73) Assignee: NanoTek, LLC, Walland, TN (US)

( * ) Notice: Subject to any disclaimer, the term of this patent is extended or adjusted under 35 U.S.C. 154(b) by 714 days.

(21) Appl. No.: 11/754,623

(22) Filed: May 29, 2007

Related U.S. Application Data

(60) Provisional application No. 60/803,660, filed on Jun. 1, 2006.

(51) Int. Cl.
*B01L 99/10* (2006.01)
*G01N 15/06* (2006.01)
*G01N 33/00* (2006.01)
*G01N 33/48* (2006.01)

(52) U.S. Cl. ........ 422/101; 422/100; 422/102; 422/103; 422/68.1; 436/43; 436/174; 436/177; 436/180; 436/181

(58) Field of Classification Search .............. 422/100, 422/101, 102, 103, 68.1; 436/174, 177, 181
See application file for complete search history.

(56) References Cited

U.S. PATENT DOCUMENTS

| | | |
|---|---|---|
| 4,670,404 A | 6/1987 | Swift et al. |
| 5,387,397 A | 2/1995 | Strauss et al. |
| 5,423,513 A | 6/1995 | Chervet et al. |
| 5,614,154 A | 3/1997 | Glatz et al. |
| 5,808,020 A | 9/1998 | Ferrieri et al. |
| 5,842,787 A | 12/1998 | Kopf-Sill et al. |
| 5,856,671 A | 1/1999 | Henion et al. |
| 5,858,187 A | 1/1999 | Ramsey et al. |
| 5,859,070 A | 1/1999 | Jackson |
| 5,921,678 A | 7/1999 | Desai et al. |
| 5,922,591 A | 7/1999 | Anderson et al. |
| 5,961,932 A | 10/1999 | Ghosh et al. |
| 5,965,092 A | 10/1999 | Chatterjee et al. |
| 5,976,472 A | 11/1999 | Chatterjee et al. |

(Continued)

FOREIGN PATENT DOCUMENTS

DE  102005025499  12/2006

(Continued)

OTHER PUBLICATIONS

J. Michael Ramsey, Chemistry and Chemical Analysis on Microfabricated Devices, Chemical and Analytical Sciences Division, Jan. 28, 2004, Oak Ridge, Tennessee.

(Continued)

*Primary Examiner* — Brian J Sines
(74) *Attorney, Agent, or Firm* — Fish & Richardson P.C.

(57) ABSTRACT

An evaporator and concentrator in a reactor and loading system concentrates ions such as fluoride ions in some embodiments, and evaporates micro- to milliliter volumes of liquid solutions including intermediate and final product in other embodiments. It efficiently re-dissolves the evaporated solution generating a product, which is transferred to an external system as desired. The external system may be a micro-fluidic reactor system and/or loading system. The evaporator/concentrator has an input port for introducing liquids and solids. A capillary tube introduces gas, such as nitrogen gas, into a volume of solution contained within a v-vial, which produces an evaporating micro bubbler. A concentric tube, surrounding the capillary tube in some embodiments, introduces gas into the empty volume above the solution inside the v-vial, which is referred to as a vapor sweep. The vapor sweep assists in removing the evaporated solution from the v-vial through a vacuum tube.

10 Claims, 12 Drawing Sheets

U.S. PATENT DOCUMENTS

| | | | |
|---|---|---|---|
| 6,001,229 A | 12/1999 | Ramsey | |
| 6,010,607 A | 1/2000 | Ramsey | |
| 6,033,546 A | 3/2000 | Ramsey | |
| 6,036,927 A | 3/2000 | Ramsey | |
| 6,062,261 A | 5/2000 | Jacobson et al. | |
| 6,106,710 A | 8/2000 | Fischer et al. | |
| 6,110,343 A | 8/2000 | Ramsey et al. | |
| 6,117,396 A | 9/2000 | Demers | |
| 6,120,666 A | 9/2000 | Jacobson et al. | |
| 6,139,734 A | 10/2000 | Settlage et al. | |
| 6,180,372 B1 | 1/2001 | Franzen | |
| 6,187,206 B1 | 2/2001 | Bernier et al. | |
| 6,231,737 B1 | 5/2001 | Ramsey et al. | |
| 6,235,471 B1 | 5/2001 | Knapp et al. | |
| 6,241,953 B1 | 6/2001 | Krijgsman | |
| 6,284,525 B1 | 9/2001 | Mathies et al. | |
| 6,315,905 B1 | 11/2001 | Settlage et al. | |
| 6,319,476 B1 | 11/2001 | Victor, Jr. et al. | |
| 6,342,142 B1 | 1/2002 | Tsutamori et al. | |
| 6,376,181 B2 | 4/2002 | Ramsey et al. | |
| 6,409,072 B1 | 6/2002 | Breuer et al. | |
| 6,440,669 B1 | 8/2002 | Bass et al. | |
| 6,444,461 B1 | 9/2002 | Knapp et al. | |
| 6,475,363 B1 | 11/2002 | Ramsey | |
| 6,485,692 B1 | 11/2002 | Freitag et al. | |
| 6,524,456 B1 | 2/2003 | Ramsey et al. | |
| 6,537,506 B1 | 3/2003 | Schwalbe et al. | |
| 6,541,274 B2 | 4/2003 | Nagle et al. | |
| 6,555,389 B1 * | 4/2003 | Ullman et al. | 436/514 |
| 6,572,830 B1 | 6/2003 | Burdon et al. | |
| 6,620,386 B1 | 9/2003 | Welch | |
| 6,632,656 B1 | 10/2003 | Thomas et al. | |
| 6,706,538 B1 * | 3/2004 | Karg et al. | 436/180 |
| 6,749,814 B1 | 6/2004 | Bergh et al. | |
| 6,806,087 B2 | 10/2004 | Kibby et al. | |
| 6,818,189 B1 | 11/2004 | Ardis et al. | |
| 6,828,143 B1 | 12/2004 | Bard | |
| 6,858,435 B2 | 2/2005 | Chervet et al. | |
| 6,890,493 B1 | 5/2005 | Bergh et al. | |
| 6,896,855 B1 | 5/2005 | Kohler et al. | |
| 6,926,313 B1 | 8/2005 | Renzi | |
| 6,958,122 B1 | 10/2005 | Gidner et al. | |
| 6,977,064 B1 | 12/2005 | Ardis et al. | |
| 7,182,371 B1 | 2/2007 | Renzi | |
| 7,220,388 B2 * | 5/2007 | Bishop et al. | 422/100 |
| 7,244,961 B2 | 7/2007 | Jovanovich et al. | |
| 7,323,345 B1 * | 1/2008 | Stjernstrom | 436/180 |
| 2004/0022696 A1 | 2/2004 | Zigler et al. | |
| 2004/0208794 A1 * | 10/2004 | Karg et al. | 422/100 |
| 2004/0258615 A1 | 12/2004 | Buchanan et al. | |
| 2005/0019213 A1 | 1/2005 | Kechagia et al. | |
| 2005/0052509 A1 | 3/2005 | Gilligan et al. | |
| 2005/0181519 A1 * | 8/2005 | Karg et al. | 436/180 |
| 2005/0221373 A1 | 10/2005 | Enzelberger et al. | |
| 2005/0226776 A1 | 10/2005 | Brady et al. | |
| 2005/0232387 A1 | 10/2005 | Padgett et al. | |
| 2006/0150385 A1 | 7/2006 | Gilligan et al. | |
| 2006/0289737 A1 | 12/2006 | Bassmann et al. | |
| 2007/0026401 A1 * | 2/2007 | Hofmann et al. | 435/6 |
| 2007/0071664 A1 | 3/2007 | Bellos et al. | |

FOREIGN PATENT DOCUMENTS

| | | |
|---|---|---|
| EP | 0 495 255 B1 | 6/1996 |
| JP | 9-263591 | 10/1997 |
| JP | 2000-249694 | 9/2000 |
| JP | 2005-065632 | 3/2005 |
| JP | 2005065632 | 3/2005 |
| PL | 0264094 | 9/1988 |
| WO | WO 99/67656 | 12/1999 |
| WO | WO 01/34660 | 5/2001 |
| WO | WO 02/11880 | 2/2002 |
| WO | WO 03/002157 | 1/2003 |
| WO | WO 03/002489 | 1/2003 |
| WO | WO 03/078358 | 9/2003 |
| WO | 05056872 | 6/2005 |
| WO | WO 2005/056872 | 6/2005 |
| WO | 05082535 | 9/2005 |
| WO | WO 2005/082535 | 9/2005 |

OTHER PUBLICATIONS

Sheila H. Dewitt, Microreactors for Chemical Synthesis, Chemical Biology, 1999, 350-356.

Stephen J. Haswell, The Application of Micro Reactors to Synthetic Chemistry, The Royal Society of Chemistry, Feb. 5, 2001, 391-398.

Ann M. Thayer, Harnessing Microreactors, Chemical and Engineering News, May 30, 2005, 43-52, vol. 83, No. 22.

Amin et al., "Peak Parking Technique for the Simultaneous Determination of Anions and Cations", Anal Bioanal Chem. 381:1426-1431, 2005.

Bodnar et al., "Exploiting the Complementary Nature of LC/MALDI/MS/MS and LC/ESI/MS/MS for Increased Proteome Coverage", J Am Soc Mass Spectrom 14:971-979, 2003.

Davis et al., "Low Flow High-Performance Liquid Chromatography Solvent Delivery System Designed for Tandem Capillary Liquid Chromatography-Mass Spectrometry", J Am Soc Mass Spectrom 6:571-577, 1995.

Davis et al., "Variable Flow Liquid Chromatography-Tandem Mass Spectrometry and the Comprehensive Analysis of Complex Protein Digest Mixtures", J Am Soc Mass Spectrom 8:1059-1069, 1997.

Dewitt, "Microreactors for chemical synthesis," Current Opinion in Chemical Biology, 1999, 3:350-356.

Geromanos et al., "Tuning of an Electrospray Ionization Source for Maximum Peptide-Ion Transmission into a Mass Spectrometer", Anal. Chem. 72:777-790, 2000.

Gillies et al., J. Label. Compds. Radiopharm., 42, (1999) S886-S888.

Goodlett et al., "Proteomics Without Polyacrylamide: Qualitative and Quantitative Uses of Tandem Mass Spectrometry in Proteome Analysis", Funct Integr Genomics 2:138-153, 2002.

Hadd et al., "Microchip Device for Performing Enzyme Assays," Anal. Chem. 1997, 67, 3407-3412.

Haswell et al., "Chemical and Biochemical Microreactors," The Royal Society of Chemistry 2001, Chem. Comm. 2001, 391-398.

Haswell et al., "The Application of Micro Reactors to Synthetic Chemistry," Chemical Communications, 2001, 391-398.

Jensen, "The Impact of MEMS on the Chemical and Pharmaceutical Industries," Solid-State Sensor and Actuator Workshop, So. Carolina, Jun. 4-8, 2000, 105-110.

Kammerer et al., "Achiral-chiral LC/LC—MS/MS Coupling for Determination of Chiral Discrimination Effects in Phenprocoumon Metabolism", Anal. Biochem. 339:297-309, 2005.

Liu et al., "Enzyme Conformational Dynamics During Catalysis and in the 'Resting State' Monitored by Hydrogen/Deuterium Exchange Mass Spectrometry", FEBS Letters 580:5137-5142, 2006.

Lu et al., "A New Approach for Sequencing Human IRS1 Phosphotyrosine-Containing Peptides Using CapLC-Q-TOF$^{micro}$", J Mass Spectrometry 40:599-607, 2005.

Martin et al., "Subfemtomole MS and MS/MS Peptide Sequence Analysis Using Nano-HPLC Micro-ESI Fourier Transform Ion Cyclotron Resonance Mass Spectrometry", Anal. Chem. 72:4266-4274, 2000.

Miyabe et al., "A Kinetic Parameter Concerning Mass Transfer in Silica Monolithic and Particulate Stationary Phases Measured by the Peak-Parking and Slow-Elution Methods", J. Sep. Sci. 29:2452-2462, 2006.

Okamoto et al., "On-line Sample Enrichment System Coupled to Electrospray Ionization Time-of-Flight Mass Spectrometry (ESI-TOF-MS)", J of Pharmaceutical and Biomedical Analysis 41:707-713, 2006.

Opiteck et al., "Comprehensive On-Line LC/LC/MS of Proteins", Anal. Chem. 69:1518-1524, 1997.

Pan et al., "Folding Kinetics of the S100A11 Protein Dimer Studied by Time-Resolved Electrospray Mass Spectrometry and Pulsed Hydrogen-Deuterium Exchange", Biochemistry 45:3005-3013, 2006.

Prolexys Pharmaceuticals, Inc., "HySpec", (2 pages).

Ramsey, "Chemistry and Chemical Analysis on Microfabricated Devices," Chemical and Analytical Sciences Division, Jan. 28, 2004, Oak Ridge, TN.

Staack et al., "The Combination of Liquid Chromatography/Tandem Mass Spectrometry and Chip-Based Infusion for Improved Screening and Characterization of Drug Metabolites", Rapid Commun. Mass Spectrom. 19:618-626, 2005.

Strittmatter et al., "Proteome Analyses Using Accurate Mass and Elution Time Peptide Tags with Capillary LC Time-of-Flight Mass Spectrometry", J Am Soc Mass Spectrom 14:980-991, 2003.

Thayer, "Harnessing Microreactions," Chemical and Engineering News, vol. 83, No. 22, May 30, 2005, 43-52.

Vissers et al., "A Novel Interface for Variable Flow Nanoscale LC/MS/MS for Improved Proteome Coverage", J Am Soc Mass Spectrom 13:760-771, 2002.

Washburn et al., "Large-scale Analysis of the Yeast Proteome by Multidimensional Protein Identification Technology", Nature Biotechnology, hhtp://biotech.nature.com, 19:242-247, 2001.

Wilm et al., "Analytical Properties of the Nanoelectrospray Ion Source", Analytical Chemistry 68:1-8, 1996.

Zeller et al., "The Impact of Chromatography and Mass Spectrometry on the Analysis of Protein Phosphorylation Sites", Anal Bioannal Chem 378:898-909, 2004.

Zhou et al., "Quasi-linear Gradients for Capillary Liquid Chromatography with Mass and Tandem Mass Spectrometry", Rapid Commun. Mass Spectrom 14:432-438, 2000.

Advion, Triversa for Metabolic Identification, 2006 (2 pages).

Corkery et al,, "Automated Nanospray Using Chip-Based Emitters for the Quantitative Analysis of Pharmaceutical Compounds", J. Am. Soc. For Mass Spectrom 16:363-369 (2005) (7 pages).

Dionex, LC Packings, Probot Microfraction Collector, 2005 (8 pages).

Dionex, Probot Microfraction Collector, 2007 (4 pages).

Eksigent, "The Eksigent NanoLC System for Proteornies", www.eksigents.com, 2003 (5 pages).

Khan et al., "Microfluidic Synthesis of Colloidal Silica", Langmuir, 20:8604-8611 (2004).

Koster et al., "A dceade of microflaidic analysis coupled with electrospray mass spectrometry: An overview", Lab Chip 7:1394-1412 (2007) (19 pages).

Lin et al., "Peak Parking Using a Finnigann™LCQ™Deca", Thermo Electron Corporation, PSB 107, 2003 (2 pages).

Lund et al., "Comparison of Peak Parking Versus Automated Fraction Analysis of a Complex Protein Mixture", Waters, PosterREPRINT, 2003 (6 pages).

Matteo et al., "High pressure flow reactor for rapid microfluidic production of PET biomarkers", J. Nucl. Med. 47(1):158P (2006) (2 pages).

Patterson et al., "Interfacing, Capillary/Nano LC with MALDI/MS for High-Throughput Proteonmics", LC Packings 2002 (1 page).

Zheng et al., "A Microfluidic Approach for Screening Submicroliter Volumes against Multiple Reagents by Using Preformed Arrays of Nanoliter Plugs in a Three-Phase Liquid/Liquid/Gas Flow", Angew Chem, Int. Ed., 44:2520-2523 (2005).

LC Packings, From the Leaders in Capillary LC, "LC/MS Tools", www.lcpackings.com (1997) 16 pages.

* cited by examiner

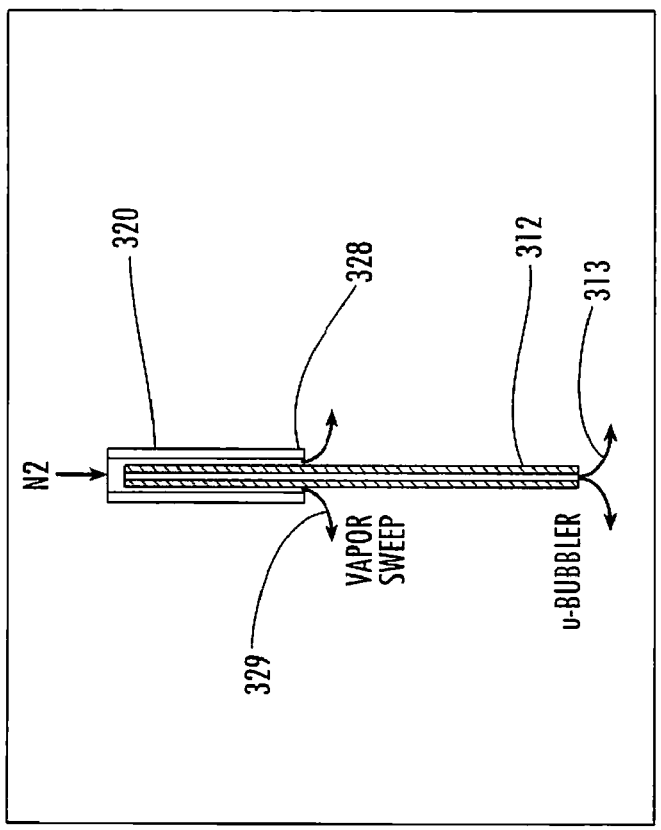
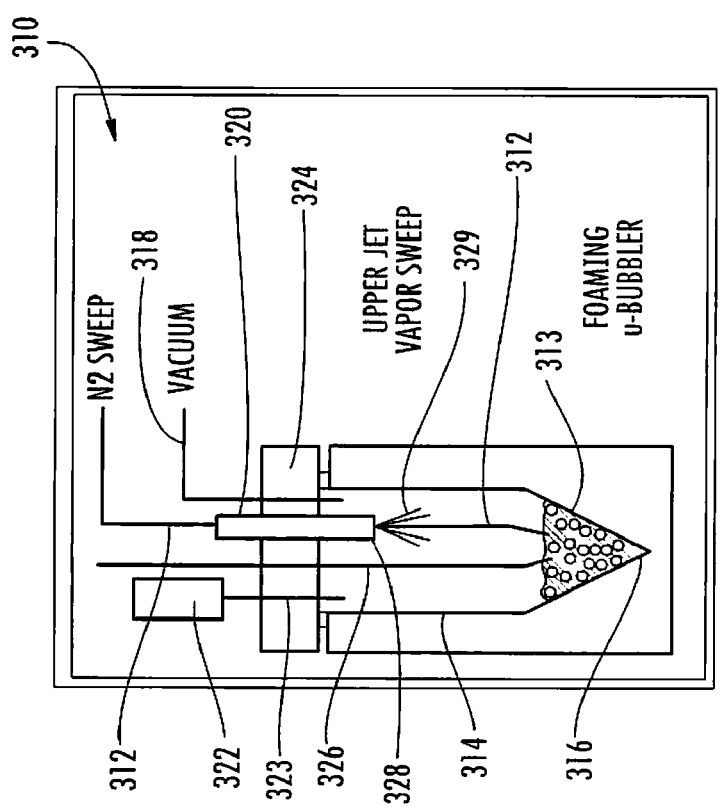
FIG. 12B
FIG. 12A

EVAPORATOR AND CONCENTRATOR IN REACTOR AND LOADING SYSTEM

CROSS REFERENCE TO RELATED APPLICATION

This patent application claims priority from and is related to U.S. Provisional Patent Application Ser. No. 60/803,660 filed Jun. 1, 2006, entitled: "Evaporator and Concentrator in Reactor and Loading System". This U.S. Provisional Patent Application is incorporated by reference in its entirety herein.

FIELD

This invention relates to the field of reaction systems. More particularly, this invention relates to an evaporator and concentrator in a reactor and loading fluidic system.

BACKGROUND AND SUMMARY

Micro-fluidics are used to manipulate fluids in channels with cross-sectional height and width that typically range from 1 to 500 micrometers or microns. Fluids are moved in volumes of nanoliters or microliters. "Lab-on-a-chip" technology has used micro-fluidics to perform chemical reactions and analyses at very high speeds while consuming small amounts of starting materials. Various chemical reactions require conditions such as high pressure and high temperatures, which may be difficult to achieve safely using conventional techniques, and micro-fluidic systems use miniaturized reactors, mixers, heat exchangers, and other processing elements for performing such chemical reactions on a miniature scale with less difficulty and more safety. Such systems are useful for reactions such as pharmaceutical or laboratory reactions where very small and accurate amounts of chemicals are necessary to successfully arrive at a desired product. Furthermore, use of micro-fluidic systems increases efficiency by reducing diffusion times and the need for excess reagents.

Applications for micro-fluidic systems are generally broad, but commercial success has been slow to develop in part because micro-fluidic devices are difficult and costly to produce. Another significant hurdle in micro-fluidics is addressing the macroscale to microscale interface. Other considerable problems include clogging of the systems, fouling of the reagent in the system, and supplying new reagent once the previous supply is depleted, clogged, or fouled. Furthermore, waste accumulations and air bubbles interfere with proper micro-fluidic system operation. Thus, there is a need for a low cost solution for micro-fluidic systems. Preferably, but not necessarily, such solution would allow easy replacement of reagent once its supply is depleted, clogged, or fouled, and allow for remotely flushing waste and air bubbles from a micro-fluidic system in order to minimize losses of costly reagent. Additionally, many reactions and mixtures require condensing and evaporation techniques that are difficult to perform on a micro- or nanoscale. As used herein, micro-fluidic and microscale are meant to describe fluidic elements that have micro-sized capillaries for transporting fluid. Such capillaries would have effective interior diameters from about 1 micron to about 500 microns. Usually a micro-fluidic element will have an interior diameter of more than 100 microns, and for many applications an inside diameter of 200 microns is a good size.

The above and other needs are met by an evaporator and concentrator in a reactor and loading system. In one embodiment, a micro-fluidic evaporator evaporates a target from a liquid solution. The evaporator has a vial with an interior volume and a first and second end. Liquid solution is disposed in the vial and extends from the second end toward the first end. The evaporator has a gas source capable of accelerating evaporation of the target and a first micro-fluidic pathway extending from the gas source to an exhaust point near the second end of the vial. The first micro-fluidic pathway inputs the gas at the exhaust point from the gas source at an input rate such that the gas effervesces through the liquid solution without substantial splashing and without exploding the liquid solution. This results in an accelerated evaporation of the target from the liquid solution producing the evaporated gas. A second fluidic pathway extends from near the first end of the vial to a location external to the vial and moves the evaporated target from the interior volume of the vial to a location external to the vial.

In some embodiments, the evaporator has a third fluidic pathway extending from the gas source to a sweep exhaust point located within the vial and adjacent to the solution but not in the solution. The third fluidic pathway inputs gas into the vial adjacent to the solution for sweeping the evaporated target through the second fluidic pathway and out of the vial. In some embodiments, the third fluidic pathway is concentric with the first micro-fluidic pathway such that the third fluidic pathway surrounds the first micro-fluidic pathway. In some embodiments, the gas source has a first and a second gas source, the first gas source being connected to the first micro-fluidic pathway and the second gas source being connected to the second fluidic pathway.

In some embodiments, the evaporator has an input supply line for inputting fluids into the vial and an output line extending from a point near the second end of the vial and within the vial to a location external to the vial. The output line exports fluid in the vial once the desired evaporation has occurred. In some embodiments the evaporator has a heater and in some it has a cooler for heating and cooling the vial respectively.

In another embodiment, an evaporator/concentrator system dries and concentrates a fluid containing ions. The system has a first vial with an interior volume and a first and second end and a first micro-fluidic pathway extending from outside the first vial to a point near the second end of the first vial. The system also has a second fluidic pathway extending from near the first end of the first vial to a location external to the first vial and a third fluidic pathway extending from a gas source to near the first end of the first vial for inputting a gas from the gas source into the first vial and out the second fluidic pathway to provide a gas sweep of the interior of the first vial. The system has an ion exchange cartridge for capturing ions and an input line for the first vial connected from the ion exchange cartridge to the first vial. A target fluid vial stores a target fluid containing target ions and provides the target fluid containing the target ions to the ion exchange cartridge. A capturing fluid vial stores a capturing fluid and provides the capturing fluid to the ion exchange cartridge.

A pump and switch valve connects the target fluid vial to the ion exchange cartridge and is configurable for pumping the target fluid from the target fluid vial through the pump and switch valve, through the ion exchange cartridge and into the first vial. The ion exchange cartridge operates to capture the target ions as the target fluid flows through the ion cartridge. The pump and switch valve also pumps the supply fluid from the first vial through the first micro-fluidic pathway and out of the first vial. Then the pump and switch valve pumps the capturing fluid from the capturing fluid vial, through the pump and switch valve and through the ion exchange cartridge into the first vial. The capturing fluid captures the target ions in the ion exchange cartridge so that the vial contains capturing fluid with target ions. Finally, the pump and switch valve connects the first micro-fluidic pathway to the gas source so that the gas flows through the first micro-fluidic pathway and effervesces the ion containing fluid and causing the water in the fluid to evaporate resulting in a concentrated ion fluid in the first vial.

In some embodiments a second vial stores a supply of anhydrous combining fluid and the pump and switch valve supplies at least some of the anhydrous combining fluid to the first vial for combining with the concentrated ion fluid to produce an anhydrous product solution. In some embodiments, the system has a dry product vial connected to the pump and switch valve for receiving the anhydrous product solution from the first vial and pumping the anhydrous product solution from the first vial to the dry product vial. In some embodiments, the dry product vial has radiation shielding.

In another embodiment, a micro-fluidic system has a pump and switch valve system that pumps fluid through the system and includes micro-fluidic tubes. The system also has a micro-fluidic concentrator including a concentrator vial for containing fluid and having a low point within the vial, the vial being configured so that the fluid flows to and collects at the low point. The concentrator also has a micro-fluidic tube extending from outside the vial to the low point in the vial to supply evaporation gas to the vial to evaporate water from fluid in the vial and thereby concentrate the fluid and withdrawing fluid from the low point in the vial. The concentrator has a sweep gas input port for supplying sweep gas into the vial at a location remote from the low point, a gas supply for supplying gases to the sweep gas input port and the micro-fluidic tube, an exhaust port in the concentrator vial for allowing gases to escape the concentrator vial, and an input port for supplying fluid to the concentrator vial. The system also has a micro-fluidic element including a micro-fluidic pathway that performs a micro-fluidic function. The pump and switch valve system pumps fluids to and from the micro-fluidic element and the micro-fluidic concentrator.

In some embodiments, the micro-fluidic element of the system is a reactor and at least two reagents are supplied by the pump and switch valve system so that the reagents are reacted in the micro-fluidic reactor and concentrated in the micro-fluidic concentrator or vice-versa. In other embodiments, the micro-fluidic element of the system is a coil of micro-fluidic tubing holding fluids and functioning as a fluid supply source and in other embodiments functioning as a reactor.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein:

FIG. 12A is a diagram of an evaporator/concentrator.

FIG. 12B is a diagram of the concentric capillary and the capillary tube of the evaporator/concentrator of FIG. 12A.

DETAILED DESCRIPTION

Figure 1:
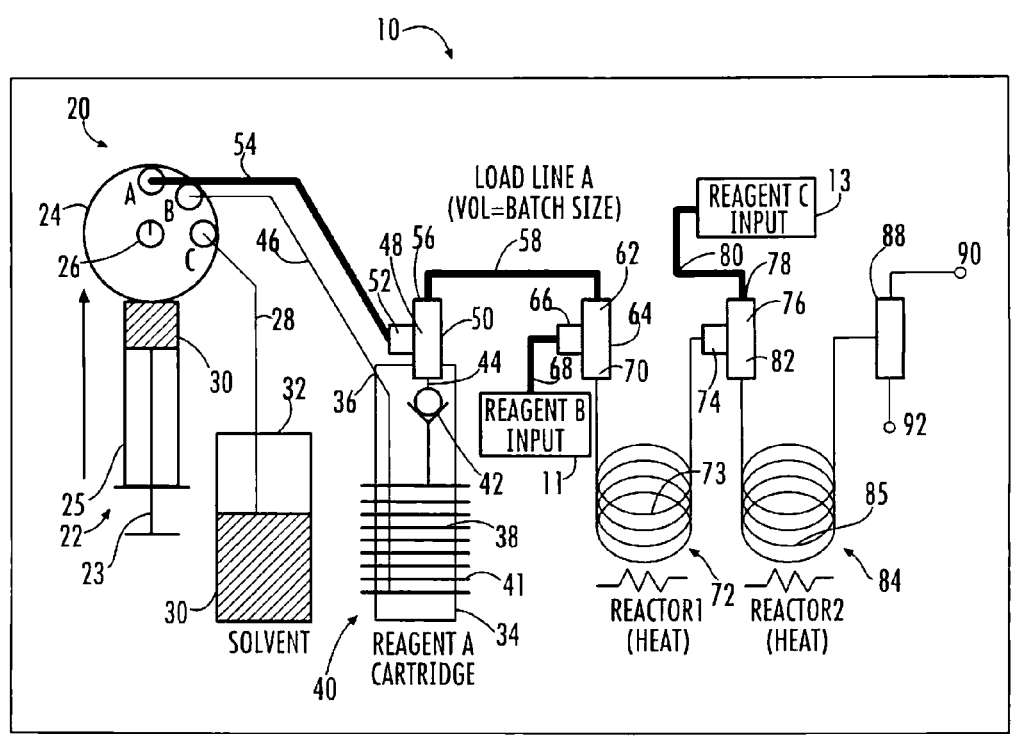
FIG. 1 is a diagrammatical drawing showing a micro-fluidic system with a reagent cartridge.

The present disclosure provides an evaporator and concentrator for concentrating fluoride ions or used to evaporate microliter to milliliter volumes of liquid solutions including intermediate and final products. Then the evaporated solutions are efficiently redissolved and the solutions are transferred to an outside system, such as a micro-fluidic system and its associated micro-fluidic reactors such as reactor 72 and reactor 84 of micro-fluidic system 10 shown in FIG. 1 below. The reactors 72 and 84 and micro-fluidic loading system 10 are disclosed in patent application Ser. No. 11/280, 116 entitled "Cartridge Based Fluid Loading System for Micro and Nanoscale Fluidic Devices filed Nov. 16, 2005, which is fully incorporated herein by reference. Additionally, detailed description of some embodiments of a micro-fluidic system 10 including reactors 72 and 84 is included herein in order to provide an example of one application embodiment of the evaporator and concentrator. FIGS. 1-11 describe some micro-fluidic system 10 embodiments, whereas the additional FIGs. describe the evaporator and concentrator 310 as shown in FIG. 12.

FIGS. 1-11 illustrate a micro-fluidic system including a low-cost micro-fluidic cartridge for loading fluids into the micro-fluidic system with no dead volume and no air bubbles. The micro-fluidic cartridge allows for multiple batches of a product from a single cartridge as well as a wide array of further advantages described below.

The preferred embodiment is a cartridge based fluid loading system for microscale and nanoscale fluidic devices and uses micro-fluidics to perform chemical reactions and analyses at very high speeds while consuming small amounts of starting materials.

Referring now to FIG. 1, a micro-fluidic system 10 is shown. In the upper left-hand corner a pump 20 includes a cylindrical syringe 22 attached to a circular switch 24. An actuator 26 is used to toggle the switch 24 among three nodes: A, B, or C. When the actuator 26 is set on node A, the syringe 22 is connected to node A, when the actuator 26 is set on node B, the syringe 22 is connected to node B, and similarly, when the actuator 26 is set on node C, the syringe 22 is connected to node C. Node C is connected to a solvent line 28 used to transport solvent 30 to and from the solvent container 32 to the syringe 22. Node B is connected to a cartridge line 46 that is connected to the reagent cartridge 34 at the cartridge input 36. The reagent cartridge 34 holds reagent 38a within a spool 40 of small bore tubing 41 or other long fluidic path.

As used herein, the term spool is intended to be used in its broadest sense. Spool is intended to include both spiral and non-spiral or non-coiled configurations of tubing or other long fluidic paths. An example of such a non-spiral configuration is a serpentine configuration. The spool 40 includes a micro-fluidic pathway that is preferably microbore tubing including tubing with an inside diameter of 10 to 3000 micrometers or microns, but other forms of micro-fluidic pathways may also be used. The spool 40 is connected to a check valve 42 that allows only fluid flow out of the spool 40, not in. Ideally, the check valve 42 is connected to the output 44 of the reagent cartridge 34. The output 44 of the reagent cartridge 34 is connected to a fluidic junction 48 at input 50 of its two inputs 50 and 52. In another embodiment, the fluidic junction 48 is contained within the reagent cartridge 34 between the check valve 42 and the output 44 of the reagent cartridge 34. The terms fluidic junction and micro-fluidic junction are used interchangeably herein and refer to all types of fluidic and micro-fluidic junctions including, for example, Y-junctions, also known as tee junctions or those with two inputs and one output or X junctions, also known as cross junctions or those with two inputs and two outputs. It should be understood that the terms fluidic junction and micro-fluidic junction include not only those types of junctions listed in the examples above but all junctions with at least one input and at least one output as well as those with many inputs and/or many outputs.

The capacity volume of the reagent cartridge 34 can be varied by adjusting the diameter and length of the tubing 41 and may reach into multi-milliliter volumes or greater by using large tubing 41 diameters. Also, the cartridge back pressure is controlled by adjusting both the length and diameter of the tubing 41. Additionally, the load volumes are controlled at the sub-nanoliter level by using a small diameter tubing 41 and long length of tubing 41. The reagent cartridge 34 is capable of pressures over 5000 psi and can be configured to allow low pressure and high pressure zones. The tubing 41 of the reagent cartridge 34 is preferably constructed of fused silica glass capillary tubing. In other embodiments the tubing 41 may be plastic (including poly-carbonate plastic polymer or fluoropolymer), or metal, or could also be a machined or micro-machined channel in various substrate materials. The tubing preferably is 500 um in diameter, and the spool 40 of tubing 41 has a length of 1m inside the reagent cartridge 34.

Figure 9:
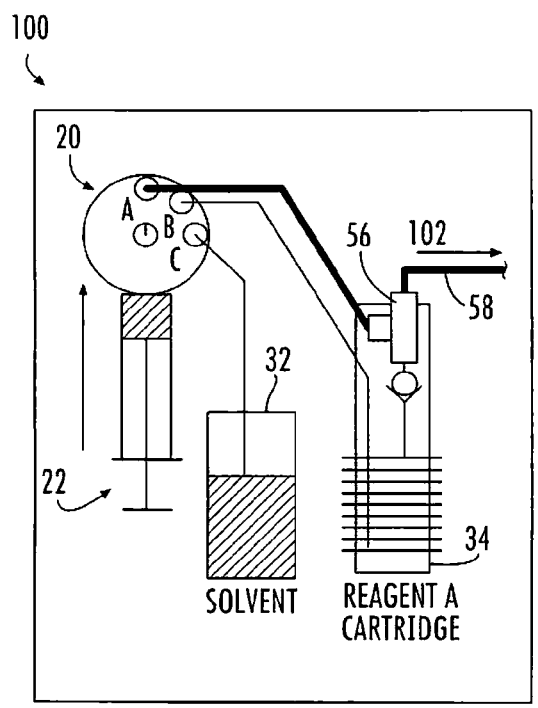
FIG. 9 is a diagrammatical drawing showing an input system of the micro-fluidic system.

Referring again to the circular switch 24, node A is connected to a dispense line 54, which is connected to the other input 52 of the fluidic junction 48. The output 56 of the fluidic junction 48 is connected to a load line 58 with a calibrated volume. Using the load line 58 with a calibrated volume facilitates precise loading of multiple batches and minimizes reactant waste. The load line is connected to an input 62 of a second fluidic junction 64. The other input 66 of the second fluidic junction 64 is connected to a second reagent load line 68 provided by a second reagent supply system 11 similar to the system described here. The output 70 of the second fluidic junction 64 is connected to a reactor 72, which is preferably formed by a passageway such as a coiled tube 73. The reactor 72 is connected to an input 74 of a third fluidic junction 76, and the other input 78 of the third fluidic junction 76 is connected to a third reagent supply system 13. Similar to the second reagent supply system 11, the third reagent supply system 13 provides a third load line 80. The output 82 of the third fluidic junction 76 is connected to a second reactor 84, again preferably formed by a passageway such as a coiled tube 85. The second reactor 84 is connected to an output switch 88 opening to either a system output 90 or a waste output 92. The second and third reagent supply systems 11 and 13 are each constructed as shown in FIG. 9.

The micro-fluidic system 10 is designed such that numerous combinations of micro-fluidic systems 10 may be used to achieve desired results. The combination shown in FIG. 1 utilizes three systems with each system 10 functioning to input each reagent used, but many more could be used in various serial and parallel combinations.

Figure 2:
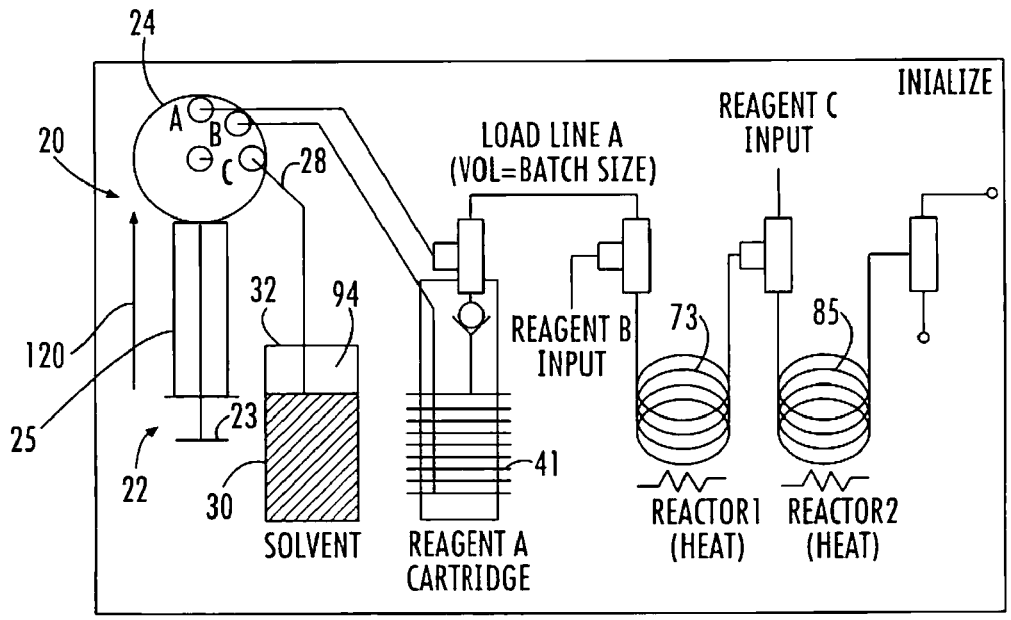
FIG. 2 is a diagrammatical drawing showing a micro-fluidic system with a reagent cartridge in an initialize step.
Figure 3:
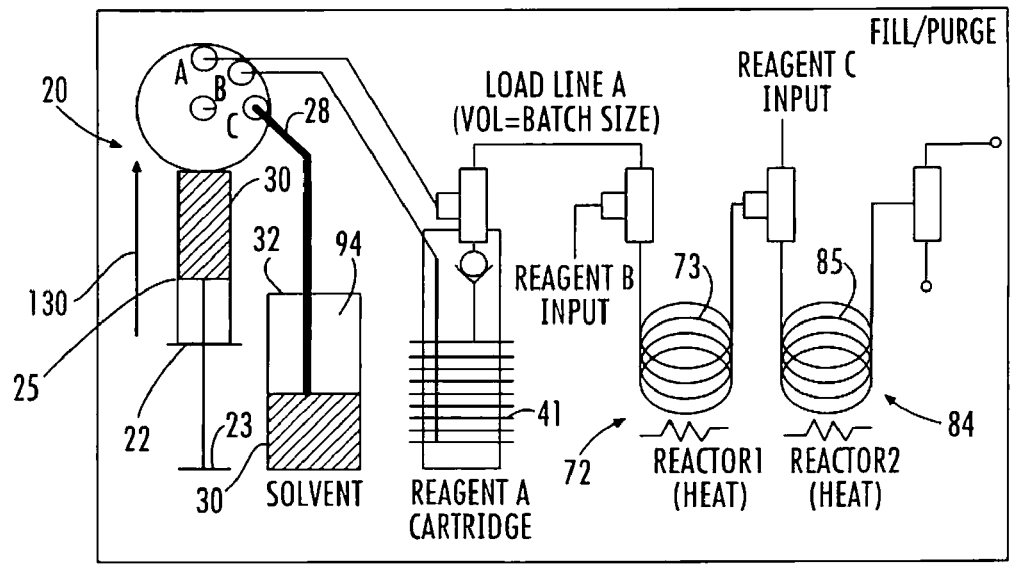
FIG. 3 is a diagrammatical drawing showing a micro-fluidic system with a reagent cartridge in a fill and purge step.

FIGS. 2 and 3 demonstrate the initialize phase and the fill/purge phase of the process respectively. In these phases node C is activated on switch 24 so that syringe 22 is connected to solvent line 28. This is demonstrated by the bold solvent line 28 in FIGS. 2 and 3. The initialize phase of FIG. 2 serves as a starting point for the fill/purge stage of FIG. 3. Referring now to FIG. 3, the fill phase and the purge phase are accomplished in the same manner and are therefore coupled on the same figure. The purpose of the fill phase of FIG. 3 is to fill syringe 22 with solvent 30 in preparation for pushing it through either node A or B, whereas the purpose of the purging phase of FIG. 3 is to remove air bubbles from the system.

To fill syringe 22, a syringe plunger 23 is pulled in a downward direction inside a syringe barrel 25 as indicated by the lower arrow of arrow 130 while node C is activated so that solvent 30 fills the syringe 22. To purge air bubbles from pump 20, syringe 22 is repeatedly filled and dispensed by moving the syringe plunger 23 up and down in the syringe barrel 25. Filling is accomplished as described above, and to accomplish dispensing, plunger 23 of syringe 22 is pushed in an upward direction as indicated by the upper arrow of arrow 130 to force all solvent 30 out of the syringe 22 and into node C, the solvent line 28, and the solvent container 32. As the solvent 30 moves from the solvent line 28 into the solvent container 32, air bubbles previously trapped inside syringe 22, node C, or the solvent line 28 will be forced into solvent container 32 and will rise through the solvent 30 in the solvent container 32 and dissipate into the open space 94 within the solvent container 32. However, some air bubbles may still be trapped inside the solvent line 28 or the pump 20 after one purging process. Therefore, the purging process may be repeated as necessary to remove all air bubbles from the system.

Figure 4:
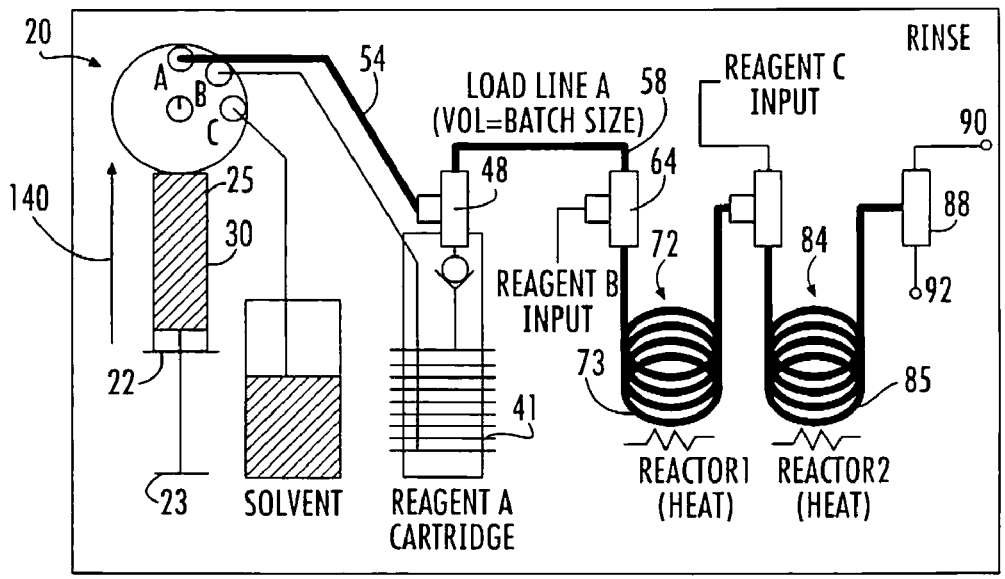
FIG. 4 is a diagrammatical drawing showing a micro-fluidic system with a reagent cartridge in a rinse step.

Once the air bubbles have been purged as shown in FIG. 3 and syringe 22 has been filled (also shown in FIG. 3), the next step is the rinse phase, which rinses the rest of the micro-fluidic system 10 as shown in FIG. 4 by the bolded dispense line 54, the bolded load line 58, and the bolded reactors 72 and 84. Arrow 140 shows the direction plunger 23 is depressed forcing the solvent 30 held in syringe 22 through the activated node A. The solvent 30 follows the bolded path discussed above: through the dispense line 54, through the first fluidic junction 48, through the load line 58, through the second fluidic junction 64, through the first reactor 72, through the third fluidic junction 76, through the second reactor 84, through switch 88 and is discharged through waste output 92. The purpose of the rinsing phase is to remove air bubbles or other unwanted residue or waste from the micro-fluidic system 10 by flushing it through the waste output 92. The rinsing phase may be repeated as necessary to remove all air bubbles, residue, or waste from the micro-fluidic system 10. Also, switch 88 may be set to the system output 90 if it is necessary to rinse the system output 90. Due to its cleansing characteristics, a solvent 30, as opposed to a reagent, is used in the rinsing phase. Also, the relatively high volume of fluid necessary to rinse the entire micro-fluidic system 10 makes rinsing with a costly reagent less desirable than rinsing with a much less expensive solvent.

Figure 5:
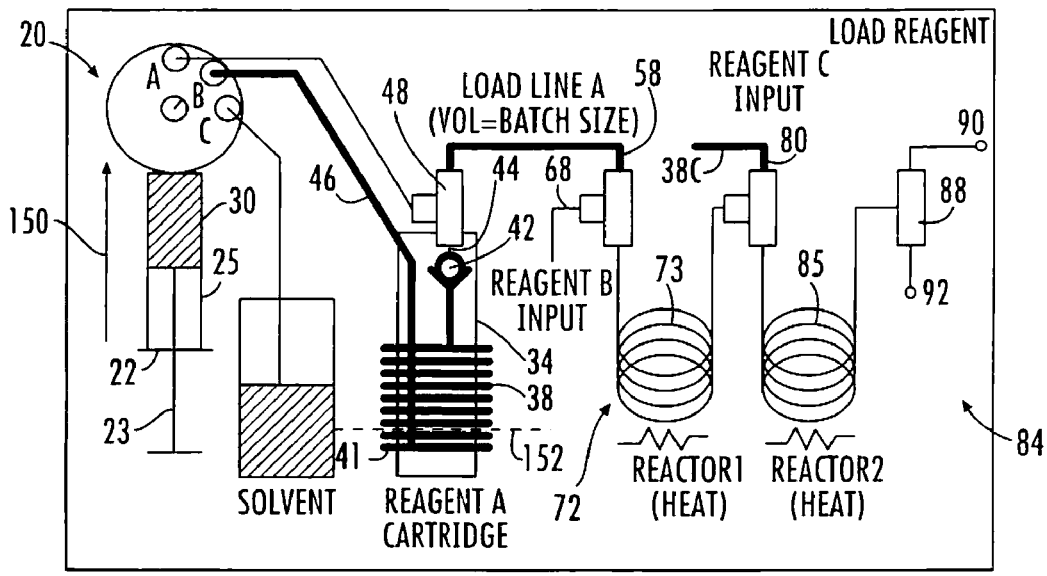
FIG. 5 is a diagrammatical drawing showing a micro-fluidic system with a reagent cartridge in a load reagent step.

The next phase is the load reagent phase and is demonstrated by FIG. 5. The purpose of this phase is to push solvent 30 with syringe 22 into the reagent cartridge 34 and force the reagent 38a out of the reagent cartridge 34, through the first fluidic junction 48 and into the load line 58. The first step of this process is to activate node B so that the pump 20 is connected to the reagent cartridge 34. Next, syringe 22 is depressed in the direction of arrow 150, forcing the solvent present in the syringe 22 into the reagent cartridge 34. The solvent 30 pushed into the reagent cartridge 34 forces reagent through the check valve 42, through the cartridge output 44, through the first fluidic junction 48, and into the load line 58, which are all bolded in FIG. 5. The load line 58 is constructed such that its volume is known, which is referred to as the load line volume. Furthermore, the syringe 22 is capable of pulling and pushing highly accurate small volumes of fluid. The combination of these two features allows the micro-fluidic system 10 to accurately fill the load line 58 with reagent 38a. Also during the load reagent phase all air bubbles present in the load line or the reactors are pushed forward to the waste output 92. Any air bubbles present in the cartridge line 46 between the solvent 30 and the reagent 38 are compressed. The load reagent phase can be performed at low pressure to reduce the potential of air bubble compression and a resulting loss of solvent as waste. Once the load line 58 is full of reagent 38a, the cartridge line 46 can be vented to the syringe 25 in order to alleviate back pressure and is accomplished by retracting the syringe.

In order to assure that the load line is full of reagent 38a, the amount of solvent 30 pumped may be increased to a volume greater than the calibrated volume of the load line 58, resulting in a small amount of reagent 38a overflow into the first reactor 72. For example, if the volume of the load line is 90 uL, 95 uL of solvent could be pushed with the syringe 22, causing 95 uL of reagent to enter the load line. Of course, the 90 uL load line could only hold 90 uL of reagent and 5 uL would enter the first reactor. In the preferred embodiment, such excess reagent 38a is disposed of as waste either at a remote waste output as discussed above or at the waste output 92. Because trapped gas bubbles are expected at the input 36 and output 44 ends of the cartridge 40, this load process ensures that no trapped gas remains in the load line 58.

Referring to FIG. 5 again, the reagent cartridge 34 may be constructed to hold a greater volume of reagent 38a than the load line 58 volume. For example, the reagent cartridge 34 could hold 400 uL of reagent. Therefore, continuing the above example where 95 uL of solvent pushed 95 uL of reagent 38a out of the reagent cartridge 34, sufficient reagent 38a would remain in the reagent cartridge 34 for up to three more cycles of reaction utilizing 95 uL of reagent 38a each cycle. On FIG. 5, near the bottom of the reagent cartridge 34, dotted line 152 represents the boundary between the solvent 30 and the reagent 38a inside the reagent cartridge 34 after the load reagent phase. Below dotted line 152 is solvent 30, but above line 152 is reagent 38a.

Also on FIG. 5, note that the second reagent supply 68 and the third reagent supply 80 are bolded, indicating two micro-fluidic systems potentially similar to the one described here are simultaneously performing load reagent phases. The other systems could perform the load reagent phases either before or after the present system, but for the first reaction to be successful, the second reagent supply system 11 is loaded before the dispense phase described below.

Figure 6:
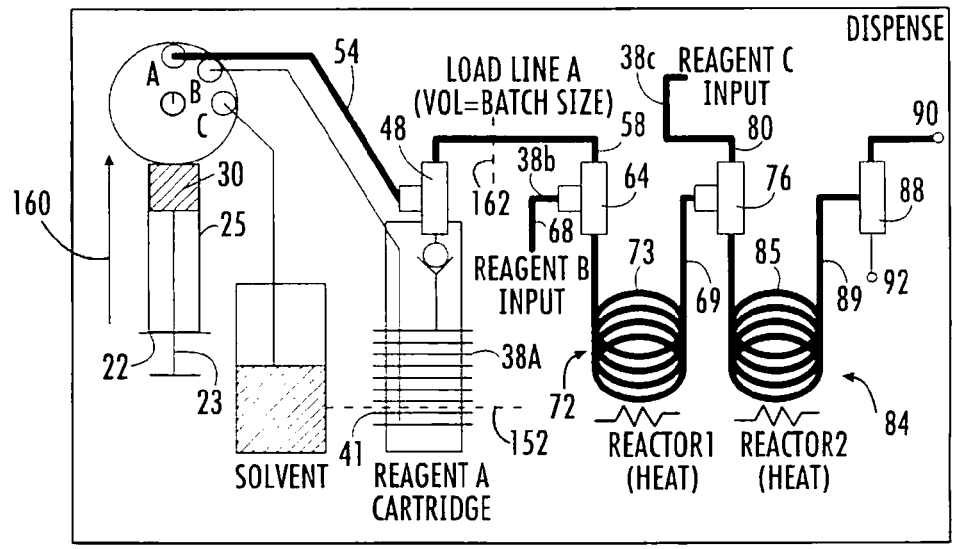
FIG. 6 is a diagrammatical drawing showing a micro-fluidic system with a reagent cartridge in a dispense step.

The dispense phase, shown in FIG. 6, performs the task of combining the reactants 38a and 38b from load line 58 and the second reagent supply load line 68 at the second fluidic junction 64. Additionally, reagent 38c from the third reagent load line 80 and the product 69 of the reaction in reactor 72 are combined in reactor 84 in the dispense phase. This is shown by the bolded path in FIG. 6 including the dispense line 54, the load line 58, the second reagent load line 68, reactor 72, the third reagent load line 80, and reactor 84. The dispense phase is accomplished by depressing the plunger 23 of the syringe 22 in the direction of arrow 160 in order to push solvent 30 through node A and into the dispense line 54. The syringe 22 continues to push solvent 30 through the fluidic junction 48 and into the load line 58. This displaces the reagent 38a present in the load line 58 from the load reagent phase, causing the reagent 38a to enter reactor 72. Ideally, the second reagent 38b is being displaced into reactor 72 simultaneously so that a reaction may occur without unnecessary waste of reagent. As reagents 38a and 38b move from the load line 58 and the second reagent load line 68 respectively, reactor 72 may perform various catalytic operations such as but not limited to temperature manipulation to expedite the reaction. Dotted line 162 represents the boundary between the solvent 30 pushed by the syringe 22 (on the left-hand side of dotted line 162) and the reagent 38a (on the right-hand side of dotted line 162) at a point in time during the dispense phase. Dotted line 162 would move from left to right along the load line 58 as the plunger 23 of the syringe 22 is further depressed, and solvent 30 would eventually fill the entire load line 58.

After the entire load line 58 has been cleared of reagent 38a and the reaction is complete, the product 69 of the first reaction is pushed into the third fluidic junction 76 (by continuing to depress the plunger 23 of the syringe 22 in the direction of arrow 160). Reagent 38c is also pushed from the third reagent load line 80. From there the combination of reagent 38c and product 69 is pushed into the second reactor 84 where a second reaction occurs and the product 89 of the second reaction is pushed out of the micro-fluidic system 10 through the output switch 88 and the system output 90. When all of product 89 is forced through the system output 90, the load line 58 and the two reactors 72 and 84 contain solvent, and, if desired in a particular application, it may be possible to immediately begin another batch by starting with the load reagent phase discussed above. The load line 58 could be dispensed in sequential sub-batches by dispensing only a fraction of the load line 58 for each batch.

The dispense phase shown in FIG. 6 can be performed at high pressure because all air bubbles between the pump and the reactor have been eliminated.

Figure 7:
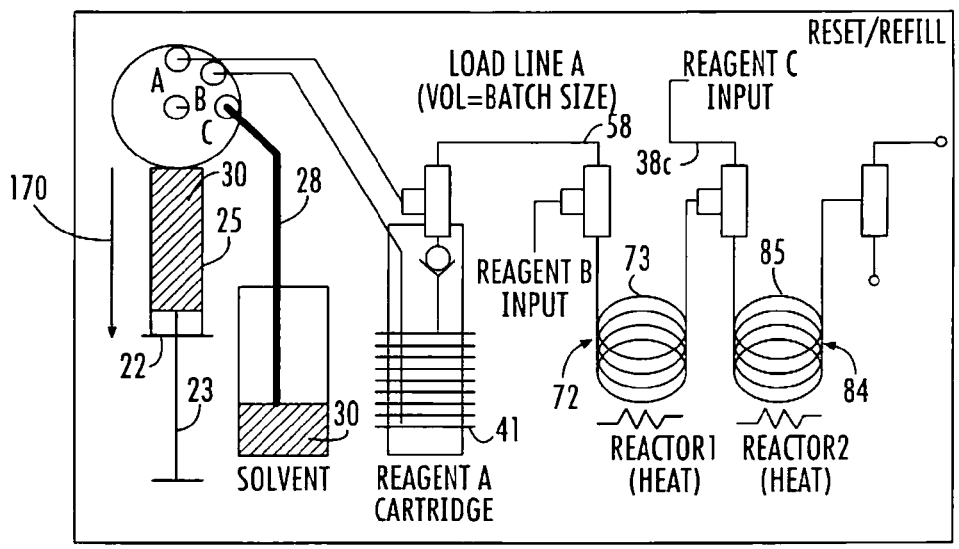
FIG. 7 is a diagrammatical drawing showing a micro-fluidic system with a reagent cartridge in a refill step.

The final phase is shown in FIG. 7 and is called the reset/refill phase. In the reset/refill phase, solvent 30 remains present in the load line 58 in order to clean it. Also, the syringe is refilled in this phase so that the entire process may be repeated. To do so, node C is activated so that the syringe 22 is connected to the solvent line 28. The syringe 22 is pulled in the direction of arrow 170 in order to pull solvent 30 from the solvent container 32 into the syringe 22.

If another batch is desired, it may be necessary or desirable to perform the initialize, fill/purge, and rinse phases, but it is also possible to begin with the load reagent phase. Beginning with the load reagent phase may be preferable if it is unnecessary to cleanse the micro-fluidic system 10 of waste or residue before running another batch of product. Another factor in determining whether to skip the initialize, fill/purge, and rinse phases is whether air bubbles are present in the system and need to be removed.

Figure 8:
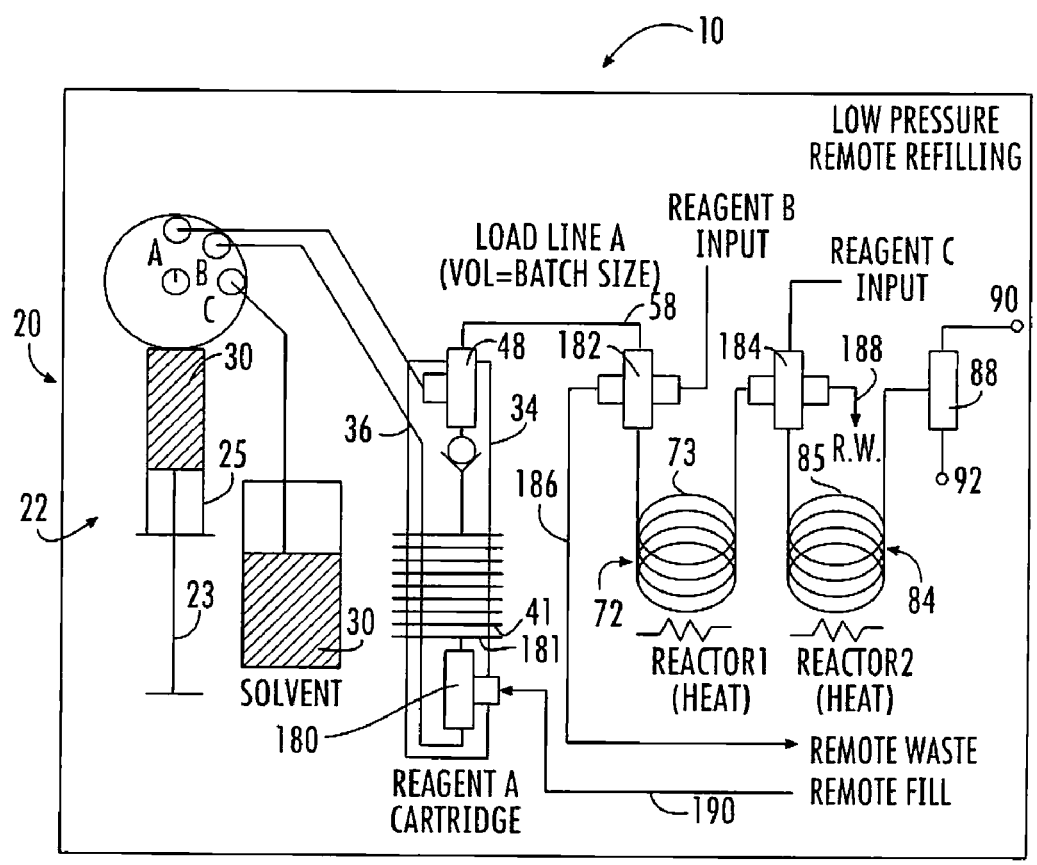
FIG. 8 is a diagrammatical drawing showing a micro-fluidic system with a reagent cartridge capable of remote filling and a reactor junction capable of remote waste output.

In another embodiment shown in FIG. 8, the reagent cartridge 34 may include a fluidic junction 180 placed in line before the reagent spool 181 allowing for remote replenishment of reagents 38 into the reagent cartridge 34 by way of a remote fill line 190. Remote filling enables multiple batches of the same product or batches of different products to be synthesized on the same reactor or reactors. It should be understood, however, that an embodiment without fluidic junction 180 has certain benefits including smaller size of the reagent cartridge and a shorter path for fluid flowing through the micro-fluidic cartridge.

In another embodiment, the second and third fluidic junctions 64 and 76 (FIG. 1) may be cross-joints 182 and 184 (FIG. 8) allowing for the remote removal of waste. The cross joints 182 and 184 provide two inputs similar to the fluidic junctions described above, but the cross joints also provide two outputs: one for the product and one for remote waste. The remote waste lines 186 and 188, attached to cross joints 182 and 184, respectively, allow the opportunity to remove waste easily from certain portions of the micro-fluidic system 10 without having to push the waste through the entire micro-fluidic system to the waste output 92.

FIG. 9 shows the input system 100 of the micro-fluidic system 10 including the syringe 22, the solvent container 32, the pump 20, the reagent cartridge 34, the fluidic junction 56, and the load line 58. For ease of demonstration, other components related to those mentioned were not numbered, but it should be understood that in some embodiments several other elements are included in the input system 100 of the micro-fluidic system 10. Arrow 102 shows the connection point where the input system 100 is connected to the reaction system 110 (shown in FIG. 10).

Figure 10:
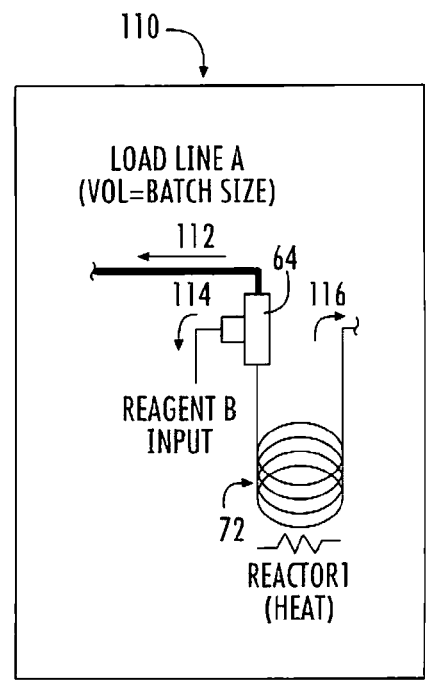
FIG. 10 is a diagrammatical drawing showing a reaction system of the micro-fluidic system.
Figure 11:
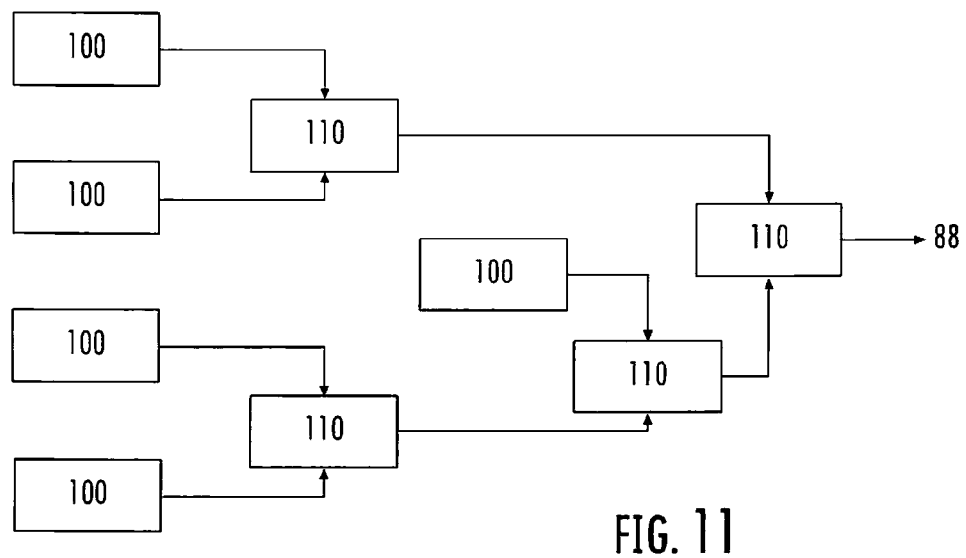
FIG. 11 is a flow diagram of a micro-fluidic system including an example of parallel and serial connections of input systems and reaction systems of a micro-fluidic system.

FIG. 10 shows the reaction system 110 of the micro-fluidic system 10 including the second fluidic junction 64 and the reactor 72. For ease of demonstration, other components related to those mentioned were not numbered, but it should be understood that in some embodiments several other elements are included in the reaction system 110 of the micro-fluidic system 10. Arrow 112 points in the direction where the reaction system 110 would be connected to an input system in order to receive reagent 38a. Arrow 114 points in the direction where the reaction system may be connected to the second reagent supply system 11 for supplying reagent 38b or may be connected, in more general terms, to an input system 110 distinct from that connected to 112. In an alternate embodiment, arrow 114 points in the direction where the reaction system 110 is connected to another reaction system 110. Similarly, arrow 116 points in the direction where the reaction system 110 may either be connected to another reaction system 110 or to an output switch 88. A graphical representation of an alternate combination of input systems and reaction systems is shown in FIG. 11. It should be understood that the input systems 100 and reaction systems 110 may be connected in numerous parallel and serial combinations such as the one shown in FIG. 11, and all of which are intended to fall under the scope of the disclosed invention and the below claims.

Referring now to FIG. 12A, one embodiment of an evaporator and concentrator 310 is shown. In some embodiments, the evaporator and concentrator 310 is used to evaporate microliter to milliliter volumes of liquid solutions including intermediate and final product and efficiently redissolve and transfer the solution to an outside system. In one embodiment, the evaporator and concentrator concentrates [$^{18}$F] fluoride ions.

A capillary tube 312 extends from the top to near the bottom 316 of a v-vial 314. In some embodiments, the capillary tube 312 has an internal diameter of less than about 100 micrometers and an outer diameter of less than about 500 micrometers. For example, the outer diameter of the capillary tube may be about 250, 363, or 500 micrometers in different embodiments respectively. A concentric gas jet 328 delivers a vapor sweep 329 inside the v-vial 314, and a microscale bubbler 313 is created at the bottom 316 of the v-vial 314 by dissemination of gas, for example nitrogen gas. The gas is fed into both the capillary tube 312 creating the microscale bubbler 313 and the concentric capillary 320 creating the vapor sweep 329 as shown in greater detail in FIG. 12B. The gas is the same type of gas, for example nitrogen gas, in some embodiments but is different types of gas in other embodiments. In this embodiments, the gas supplied to the microscale bubbler 313 is sourced separately from the gas supplied to the vapor sweep 329, but in some embodiments the source is the same.

With continued reference to both FIGS. 12A and 12B, the microscale bubbler 313 provides efficient evaporation and eliminates splashing and exploding as the volume of solution is reduced. As the micro jet of gas exits the capillary tube 312 and enters the solution, a gentle foaming occurs resulting in evaporation of the solution. The foaming provides sufficient aeration of the solution for evaporation, but eliminates splashing and potential exploding of the resulting droplets of the solution as the solution evaporates.

A cap 324 covers the v-vial and seals it from the environment in order to prevent undesired escape of input gases or evaporation gases. An input supply 322 connected to an input port 323 provides the capability to introduce solutions and solids into the v-vial 314. The input port 323, in addition to an output port 326, penetrates the cap 324 and provide pathways for introducing and removing matter to and from the v-vial 314, respectively. The output port 326, in the embodiment shown in FIGS. 12A and 12B, extends near the bottom 316 of the v-vial 314, and as such, typically provides an output for the solution contained within the v-vial 314. Additionally, a vacuum capillary 318 penetrates the cap 324 and provides an output for any gases present in the upper portion of the v-vial, such as those gases present as the result of evaporation of the solution within the v-vial 314.

In this embodiment, the capillary tubing used in construction of the capillary tube 312, and in some embodiments, the output port 326, the input port 323, and the vacuum capillary 318, are made of glass and have microscale inner and outer diameters.

In one example of operation of the concentrator and evaporator 310, a solution supplied by input supply 322 is input into the v-vial 314 by input port 323. Gas, for example, nitrogen gas, is input into the v-vial 314 through capillary tube 312 and concentric capillary 320. The nitrogen gas exits the lower end of capillary tube 312, into the solution at the bottom 316 of the v-vial 314, gently foaming the solution and causing rapid evaporation of the solution. The nitrogen gas from concentric capillary 320 flows into the volume above the solution inside the v-vial 314 and sweeps the gases above the solution upwardly and out the vacuum capillary 318. A vacuum is created in the vacuum capillary 318, such that the pressure inside the v-vial 314 is greater than the pressure within the vacuum capillary 318 causing the gases within the v-vial to dissipate into the volume within the vacuum capillary 318 and be drawn out of the v-vial 314. Once the solution is evaporated to the extent desired, the remaining solution in the bottom 316 of the v-vial 314 is withdrawn from the v-vial 314 using the output port 326. Similar to the vacuum capillary 318, a vacuum may be created within the output port 326 such that the pressure within the v-vial is greater than the pressure within the output port causing the solution to be pulled into the volume of the output port 326 and exit the v-vial 314. Alternatively, or in conjunction with a created vacuum, the positive pressure within the v-vial assists the exit of remaining solution through the output port 326. Such positive pressure is created by continuing to input nitrogen through the capillary tube 312 and/or the concentric capillary 320 and stopping flow through the vacuum capillary 318.

Figure 13:
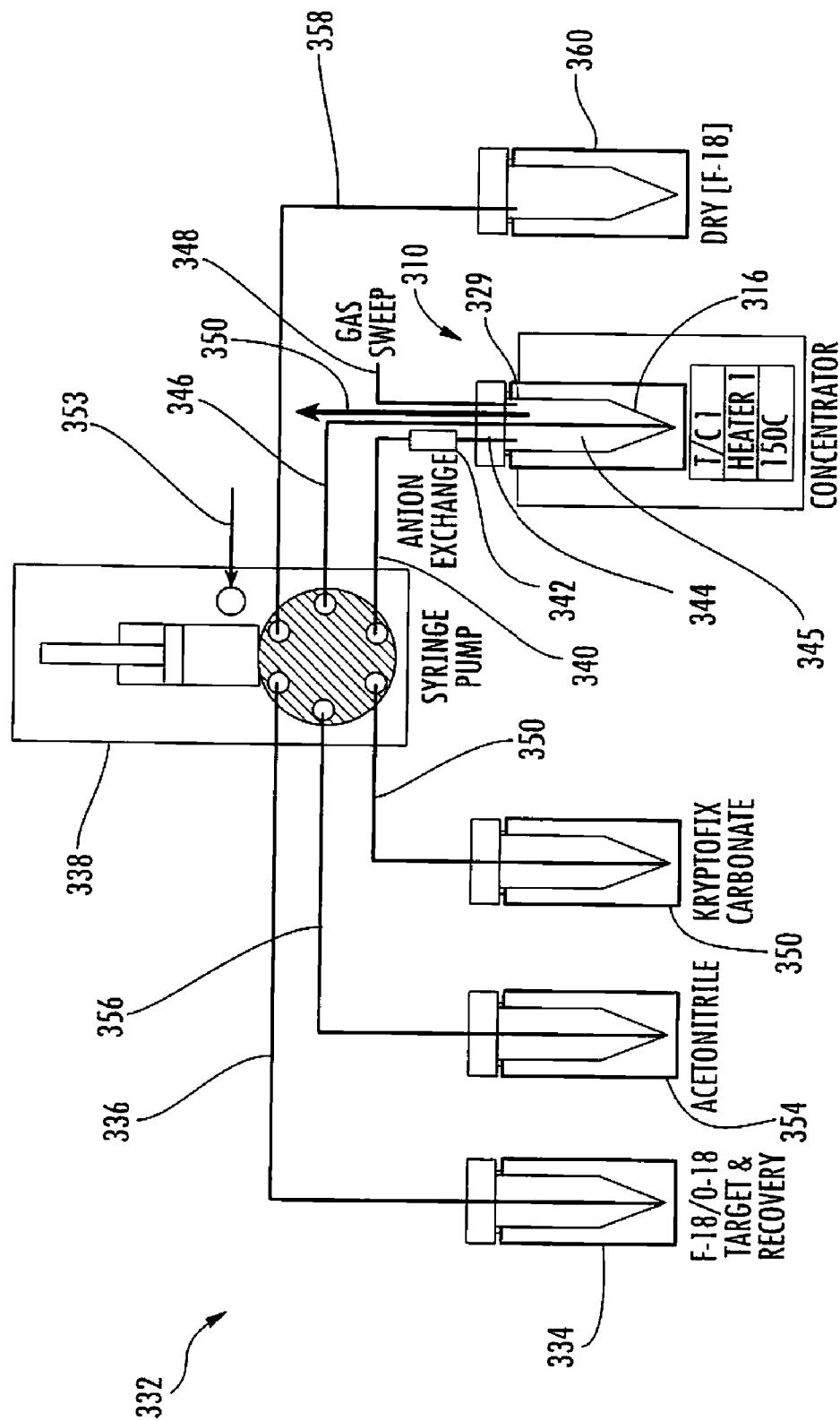
FIG. 13 is a diagram of a concentrator system including a concentrator.

In another example of operation of the concentrator and evaporator 310 as shown in FIG. 13, [$^{18}$F] fluoride ions are captured from cyclotron target water. Then the [$^{18}$F] fluoride ions are dried, redissolved in acetonitrile, and saved in a product vial for subsequent delivery into an outside system such as a microreactor system 10 as shown in FIGS. 1-11. The [$^{18}$F] fluoride ion is produced via the (p, n) nuclear reaction on oxygen enriched ($^{18}$O) water using a low-energy, 11 MeV cyclotron with typical yields of 2.5 Ci in a small volume target, for example 1 mL. The [$^{18}$F] fluoride ions are subsequently captured from the cyclotron target [$^{18}$O] water by passing it over an ion exchange resin. In a first preferred embodiment, the resin is QMA of Waters, Inc., which is an acryl amide copolymer on Diol silica. In a second preferred embodiment, the resin is AG MP-1 of Bio-Rad Laboratories, which is a dimethylamine functionalized chloromethylated copolymer of styrene and divinylbenzene. Although other resins may exhibit similar characteristics as those discussed above and be equally effective as those above, the above resins have been shown to be successful and have typically been used in large amounts.

The [$^{18}$F] fluoride ions are trapped on the surface of the resin and released using a kryptofix/potassium carbonate mixture. The cation, which is K$^+$, is caged in the kryptofix, producing a "naked" fluoride ion that is highly reactive. [$^{18}$F] fluoride ions can be captured in from about 50 microliters to about 500 microliters of solution containing approximately ten percent water. In one specific embodiment, 350 microliters of solution is used. 0.3% water content or less is necessary for desired labeling yields.

With continued reference to FIG. 13, the v-vial 314 and concentrator 310 is connected to a system 332 that uses miniature MP-1 ion exchange cartridges to capture fluoride ions from a large volume of target water. The process begins by supplying the target product in v-vial 334 and pumping it through line 336 to a pump and switch 338. The pump/switch directs the product via line 340 to an ion exchange column 342, which captures the [$^{18}$F] fluoride ions. Ion exchange column 342 is similar or the same as the input supply 322 of FIG. 12 as discussed above. The remainder of the product is deposited into v-vial 345, which is an evaporator and concentrator similar to 310 as discussed with regard to FIG. 12 above. The product is then pumped via lines 346 and 336 to v-vial 334, where the process originated.

Next, kryptofix carbonate is pumped from v-vial 350 through lines 352 and 340 through the ion exchange column 342. The kryptofix carbonate captures the [$^{18}$F] fluoride ions and the solution is delivered to v-vial 345. Nitrogen is then supplied to the pump/switch 338 and is directed through line 346 to the bottom 316 of v-vial 345 in order to form a micro bubbler that bubbles the solution. In some embodiments heat is added by v-vial 345 assisting in the evaporation of the water from the solution. A vapor sweep 329 of nitrogen is provided to v-vial 345 through line 348 and a gas exhaust is provided by line 350. The solution is gently bubbled and the water evaporates without splashing or potential explosion. The evaporated water is removed by the vapor sweep gas through exhaust line 350. V-vial 345, in some embodiments, cools the solution once the desired amount of evaporation has occurred. Next, acetonitrile is supplied from v-vial 350 through line 352 and line 346 to v-vial 345, and the anhydrous (also referred to as "dry"), combined solution is supplied to the dry product v-vial 360 through line 358. The anhydrous combined solution may be further processed or used as the final product.

Figure 14:
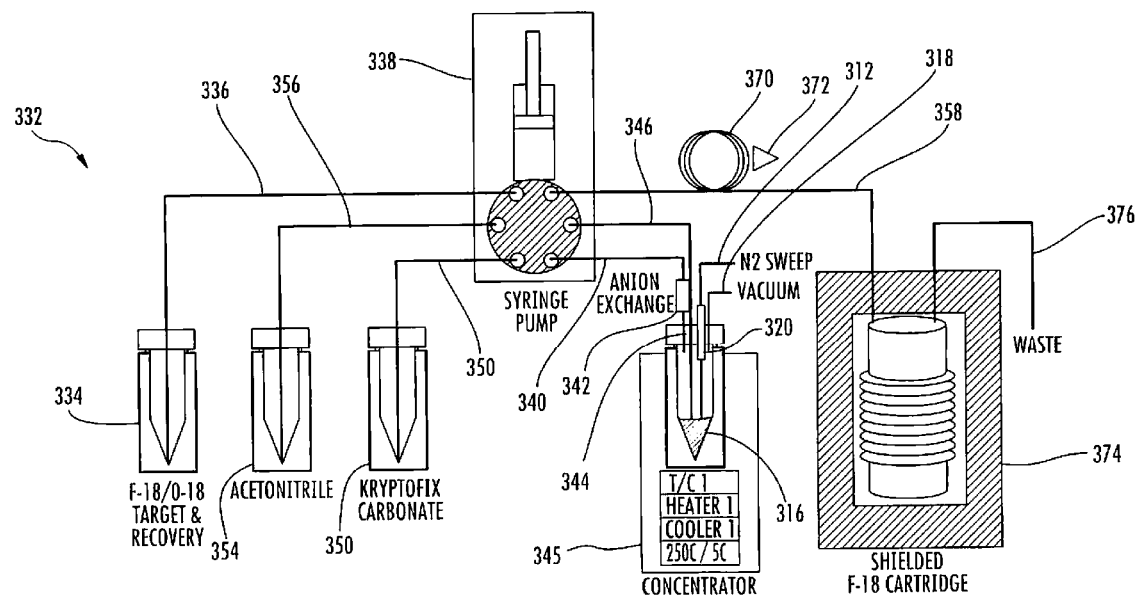
FIG. 14 is a diagram of a concentrator system including a reactor and a radiation detector connected between a pump and a shielded product cartridge.

In the embodiment of FIG. 14, a [$^{18}$F] fluoride ion concentrator system 332 similar to that discussed with reference to FIG. 13 above is shown. In this embodiment, the concentrator 345 is provided with a vapor sweep 329 through concentric capillary 320 and a micro bubbler 313 through capillary tube 312. Lines 320 and 312 are independent of the pump/switch 338. Additionally, the final product is output through a coil line 370 to a shielded [$^{18}$F] fluoride ion cartridge 374. Before filling the [$^{18}$F] fluoride ion cartridge 374 with the product, it is purged with a solvent, which is expelled through waste line 376 in some embodiments. A radiation meter 372 is provided in some embodiments, adjacent to the coil 370 that contains a known volume of fluoride ion solution so that a meaningful measurement of the radioactivity of the [$^{18}$F] fluoride ion can be taken. Finally, the anhydrous final product is transferred to a shielded reagent cartridge where it can be used in an outside system.

Figure 15:
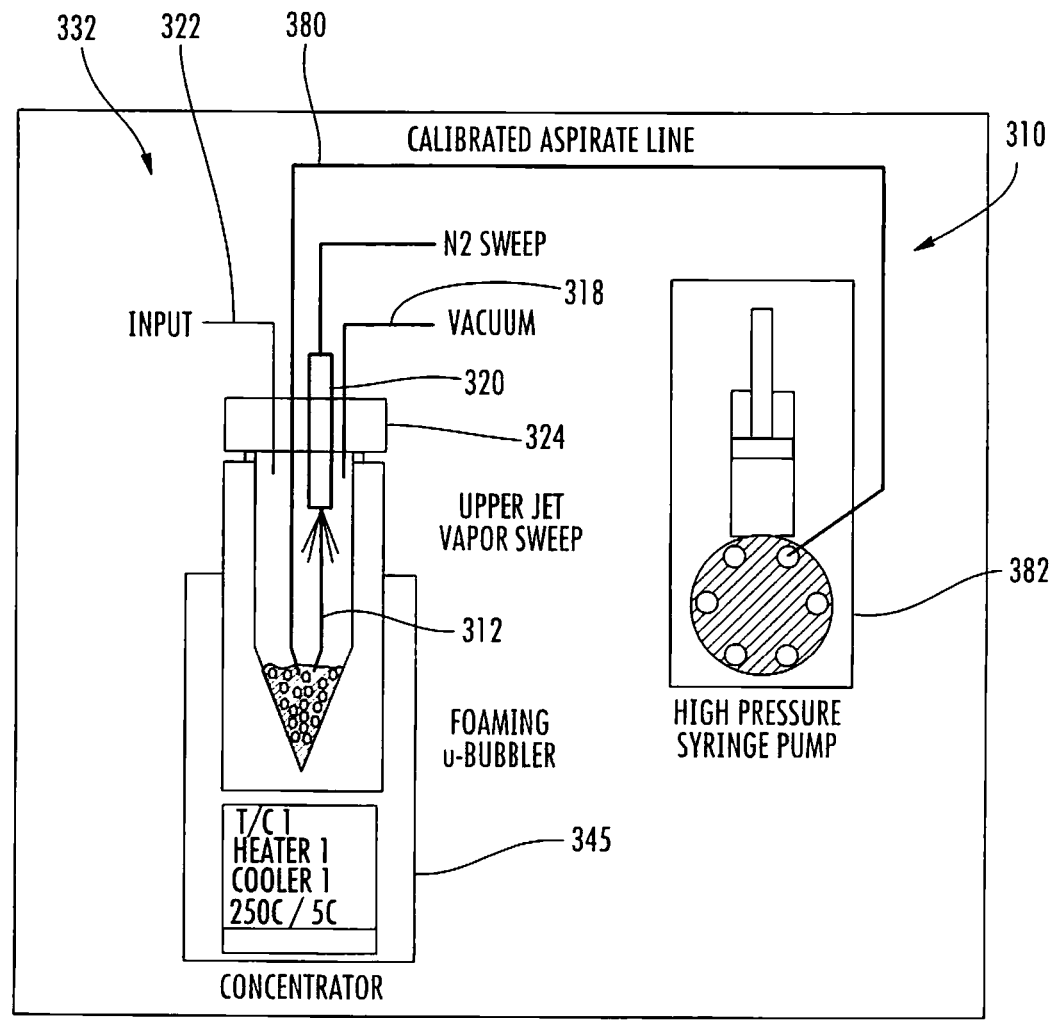
FIG. 15 is a diagram of an evaporator system including a high pressure pump.

Referring now to FIG. 15, a microevaporator solvent exchange system 332 using an evaporator similar to evaporator 310 discussed with reference to FIG. 12 above is shown. This system 332 efficiently evaporates intermediate compounds that can be redissolved with different organic solvents. This evaporator embodiment rapidly cools the v-vial 345 and aspirates microliter volumes.

In this embodiment, a resistive heater and a peltier cooler (heater/cooler 347) are used to rapidly change the temperature in the v-vial 345. The micro bubbler is created by inputting gas through capillary tube 312, which is specifically chosen for this embodiment to have an internal diameter of about 350 micrometers and is made of glass. This configuration results in aspiration of small volumes from the v-vial 345. A multi-port valve 382 having discrete fluid pathways is used in conjunction with an aspiration line 380, which has a calibrated volume. This combination precisely draws and dispenses the entire evaporator volume. A solvent preload purges air from the system 332, and a solvent chase ensures the contents of the evaporator are delivered in a process similar to that discussed regarding FIGS. 1-11 to a microfluidic system 10 and/or reactors such as reactors 72 and 84. This configuration typically requires a high pressure pump 383 in order to transfer the aspirated volumes.

Figure 16:
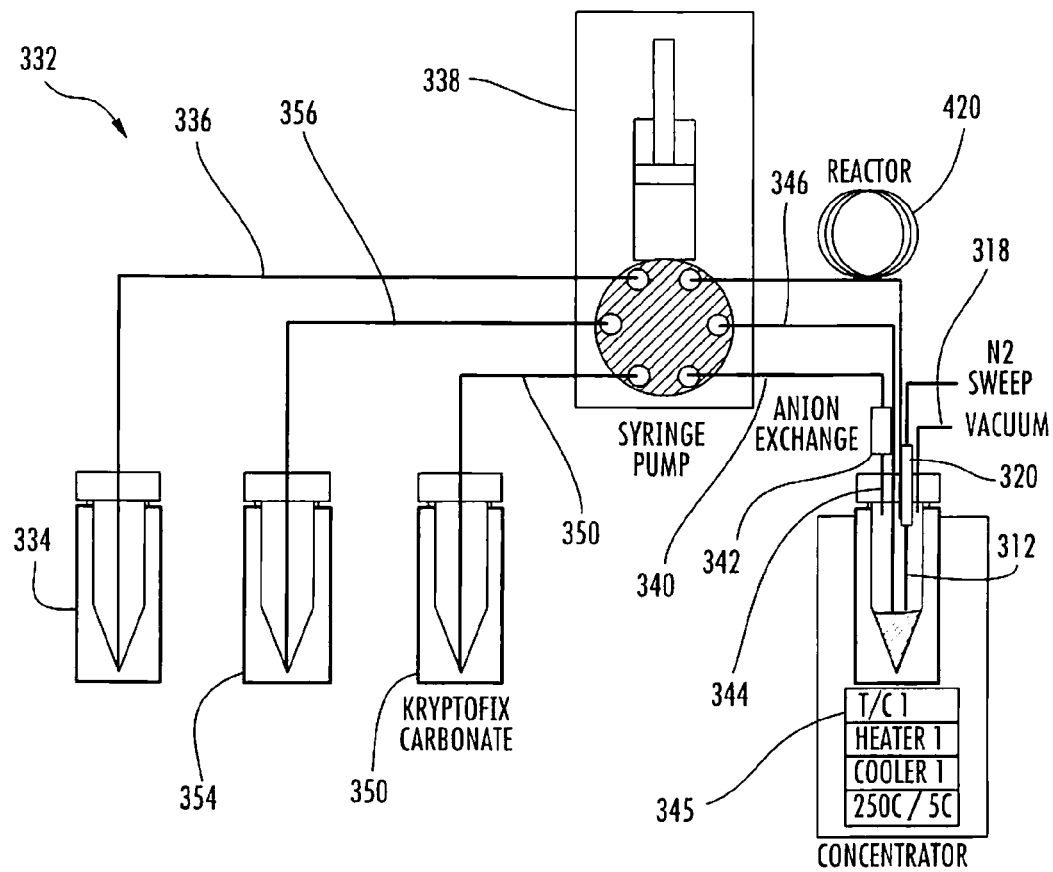
FIG. 16 is a diagram of an evaporator/reactor application including a reactor connected between a pump and an evaporator.

Referring now to FIG. 16, an example of an evaporator/microreactor application is shown. In this system 332, the concentrator/evaporator 345 is connected to a reactor 420, which is also connected to the pump/switch 338. The v-vial 345 is used as an evaporator or as a solution phase reactor in this embodiment. It can also be used as a mixing chamber to combine two or more reactants, the mixture of which is pushed through the connected reactor 420. For example, reactants from v-vials 350 and 354 are pumped by the pump/switch 338 into v-vial 345 where gas such as nitrogen is introduced through capillary tube 312. The nitrogen gently bubbles and stirs the reactants, and the mixing reactants may be cooled and/or heated. Next, the mixed reactants are pumped directly into the reactor 420 where the reactants are further heated and/or cooled in some embodiments. Alternatively, the reactants are pumped from v-vial 345 to another v-vial such as v-vial 334 and subsequently pumped from v-vial 334 to the reactor 420 where two or more reactants may be heated or cooled during the reaction process.

Next, the product from the reactor 420 is pumped back into v-vial 345 using a solvent pumped from another v-vial, for example v-vial 334. The reactor 420 product, in some embodiments, is delivered externally with respect to the system 332, by way of a capillary output (not shown). If the product is delivered back to v-vial 345, it is further processed such as by evaporation, concentration, or other reaction steps in some embodiments.

Figure 17:
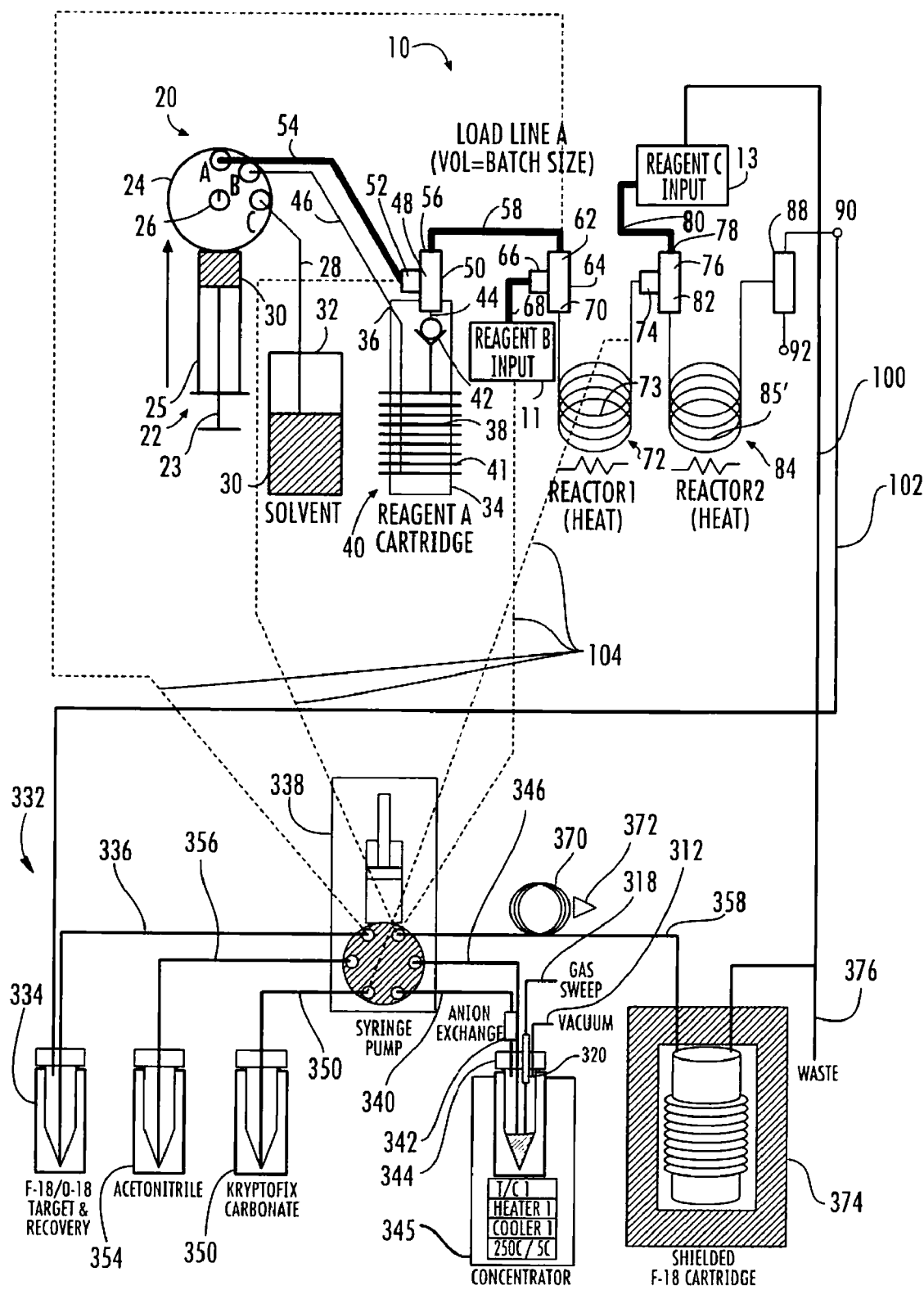
FIG. 17 is a diagram of the concentrator system of FIG. 14 connected with a micro-fluidic system such as those shown in FIGS. 1-11.

Referring now to FIG. 17, a micro-fluidic system 10 as illustrated and discussed with reference to FIGS. 1-11 is shown in the upper half of the figure and a system 332 having a concentrator/evaporator 345 is illustrated in the lower half of the figure. One of many possible connections between the micro-fluidic system 10 and the concentrator/evaporator system 332 is shown in FIG. 17. In this embodiment, capillary line 100 is connected from the output of the shielded cartridge 374 to the reagent input 13 of reactor 84. Similarly, the output of reactor 384 is connected by line 102 to the input of the concentrator/evaporator system 332 at v-vial 334.

In this configuration, the output of the microreactor system 10 is an input for the concentrator/evaporator system 332 and vise versa. Other combinations of reactor systems 10, load system and concentrator/evaporator systems 332 are contemplated as indicated by the dashed lines 104 in FIG. 17. However, all of the dashed lines 104 are not necessarily present in any one embodiment but different combinations of the dashed lines 104 and lines 100 and 102 are present in various embodiments. Also, in embodiments where lines 100 and 102 are present, they may require active control in embodiments wherein another line is connected to the same nodes or to the line 100 and/or 102 itself.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A micro-fluidic evaporator for evaporating a target from a liquid solution, the evaporator comprising:

a vial having an interior volume with a first end and a second end, the liquid solution being disposed in the vial extending from the second end toward the first end;

a gas source capable of accelerating evaporation of the target;

a first micro-fluidic pathway extending from the gas source to an exhaust point near the second end of the vial and for inputting the gas at the exhaust point from the gas source at an input rate such that the gas effervesces through the liquid solution without substantial splashing and without exploding the liquid solution and thereby accelerates evaporation of the target from the liquid solution producing the evaporated gas;

a second fluidic pathway extending from near the first end of the vial to a location external to the vial and for moving the evaporated target from the interior volume of the vial to a location external of the vial.

2. The evaporator of claim 1 further comprising a third fluidic pathway extending from the gas source to a sweep exhaust point located within the vial, located adjacent to the solution, but not located in the solution, the third fluidic pathway for inputting gas into the vial adjacent to the solution for sweeping the evaporated target through the second fluidic pathway and out of the vial.

3. The evaporator of claim 1 wherein the first micro-fluidic pathway is a micro-fluidic capillary tube having an inner diameter of less than about 100 micrometers and an outer diameter of less than about 500 micrometers.

4. The evaporator of claim 1 wherein the second fluidic pathway is a capillary tube having an inner diameter of greater than about 200 micrometers and an outer diameter of less than about 750 micrometers.

5. The evaporator of claim 2 wherein the third fluidic pathway is concentric with the first micro-fluidic pathway such that the third fluidic pathway surrounds the first micro-fluidic pathway.

6. The evaporator of claim 1 wherein the gas source comprises first and second gas sources, the first gas source being connected to the first micro-fluidic pathway and the second gas source being connected to the second fluidic pathway.

7. The evaporator of claim 1 further comprising an input supply line for inputting fluids into the vial.

8. The evaporator of claim 1 further comprising an output line extending from a point near the second end and within the vial to a location external to the vial and for exporting fluid in the vial after the desired evaporation has occurred.

9. The evaporator of claim 1 wherein the vial comprises a heater for heating the vial.

10. The evaporator of claim 1 wherein the vial comprises a cooler for cooling the vial.

\* \* \* \* \*